(12) United States Patent
Thompson et al.

(10) Patent No.: US 7,883,634 B2
(45) Date of Patent: *Feb. 8, 2011

(54) ELEVATOR LOAD BEARING MEMBER HAVING A JACKET WITH AT LEAST ONE TRACTION-ENHANCING EXTERIOR SURFACE

(75) Inventors: Mark S. Thompson, Tolland, CT (US); John P. Wesson, Vernon, CT (US); William A. Veronesi, Hartford, CT (US); Hugh J. O'Donnell, Longmeadow, MA (US); John Pitts, Avon, CT (US); William C. Perron, Burlinngton, CT (US); Ary O. Mello, Farmington, CT (US); Kathryn Rauss, Bristol, CT (US)

(73) Assignee: Otis Elevator Company, Farmington, CT (US)

( * ) Notice: Subject to any disclaimer, the term of this patent is extended or adjusted under 35 U.S.C. 154(b) by 622 days.

This patent is subject to a terminal disclaimer.

(21) Appl. No.: 11/814,568

(22) PCT Filed: Feb. 9, 2005

(86) PCT No.: PCT/US2005/004257
§ 371 (c)(1),
(2), (4) Date: Jul. 24, 2007

(87) PCT Pub. No.: WO2006/085881
PCT Pub. Date: Aug. 17, 2006

(65) Prior Publication Data
US 2008/0156592 A1     Jul. 3, 2008

(51) Int. Cl.
*C03C 15/00* (2006.01)
*B44C 1/22* (2006.01)

(52) U.S. Cl. .............................. 216/83; 216/38; 216/52; 216/53
(58) Field of Classification Search ................... 216/52, 216/83; 187/411
See application file for complete search history.

(56) References Cited

U.S. PATENT DOCUMENTS 4,565,771 A * 1/1986 Lynch et al. ................ 430/307

(Continued)

FOREIGN PATENT DOCUMENTS

WO        0040497        7/2000

(Continued)

OTHER PUBLICATIONS

International Search Report and Written Opinion of the International Search Authority for Internaitonal application No. PCT/US05/04257, mailed on Nov. 15, 2005.

(Continued)

*Primary Examiner*—Nadine G Norton
*Assistant Examiner*—Patti Lin
(74) *Attorney, Agent, or Firm*—Carlson, Gaskey & Olds PC

(57) ABSTRACT

An elevator load bearing member assembly includes at least one traction enhancing surface (46) on a jacket (44). In one example, a mechanical removal process is used to strip away at least some of an amide-rich layer from the surface (46) after the jacket has been extruded onto tension members (42). In another example, a chemical removal process is used. Another disclosed example includes disrupting the surface.

23 Claims, 3 Drawing Sheets

U.S. PATENT DOCUMENTS

| | | |
|---|---|---|
| 6,245,822 B1 | 6/2001 | Terada et al. |
| 6,488,123 B2 | 12/2002 | Pitts et al. |
| 2002/0175055 A1 | 11/2002 | Ryde |
| 2003/0024770 A1 | 2/2003 | O'donnell et al. |

FOREIGN PATENT DOCUMENTS

| | | |
|---|---|---|
| WO | 2004071925 A1 | 8/2004 |
| WO | 2005094255 A2 | 10/2005 |

OTHER PUBLICATIONS

International Preliminary Report on Patentability for International application No. PCT/US0-5/04257 mailed on Aug. 9, 2006.

Supplementary European Search Report for Application No. EP 05 71 3290 mailed Jan. 15, 2010.

Molkow M: "Wire Ropes and New Suspension Means Design, Use, Safety, Handling and Care, Discard Criteria" Life Report, VFZ Verlag, Dortmunt, DE, vol. 27, No. 5, Sep. 1, 2001, pp. 14, 16, 18-20, XP001092527, ISSN: 0341-3721.

* cited by examiner

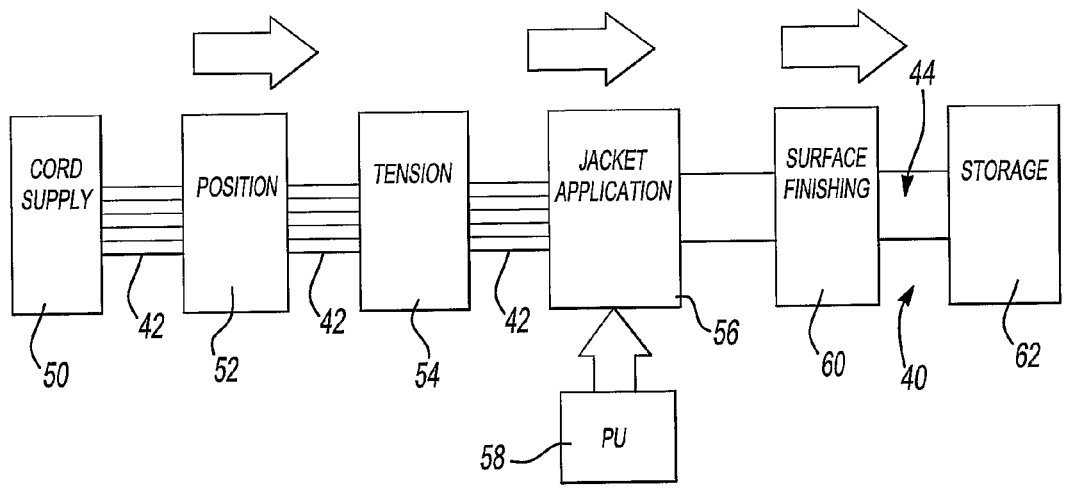
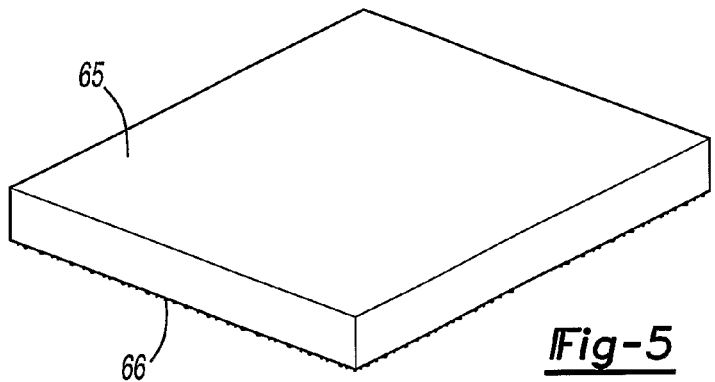
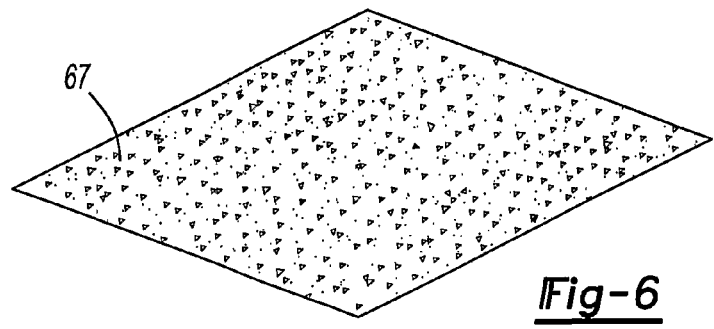

ELEVATOR LOAD BEARING MEMBER HAVING A JACKET WITH AT LEAST ONE TRACTION-ENHANCING EXTERIOR SURFACE

FIELD OF THE INVENTION

This invention generally relates to load bearing members for use in elevator systems. More particularly, this invention relates to an elevator load bearing member having a specialized jacket surface.

DESCRIPTION OF THE RELATED ART

Elevator systems typically include a cab and counterweight that move within a hoistway to transport passengers or cargo to different landings within a building, for example. A load bearing member, such as roping or a belt typically moves over a set of sheaves and supports the load of the cab and counterweight. There are a variety of types of load bearing members used in elevator systems.

Example load bearing members include a polymer jacket (e.g., polyurethane or nylon) surrounding tension members (e.g., steel cords or aramid fibers). Such arrangements may be round or flat.

In the case of some load bearing members, an extrusion process for applying a jacket over the tension members requires selecting a material having chemical properties that are beneficial for the process of applying the jacket. The resulting jacket, however, may present difficulties in having the desired level of traction when installed in an elevator system. With some materials that are beneficial from a processing standpoint, the resulting coefficient of friction between the jacket and an elevator sheave surface may be higher or lower than desirable for meeting the traction requirements within the hoistway.

Typical processes result in a smooth or glossy exterior of the jacket on the sheave contacting surfaces. In some instances, this smoothness can introduce undesirable adhesion between the jacket and a traction sheave. In most cases, the resulting coefficient of friction between the smooth surface and a traction sheave is not consistent with desired traction performance.

Some jackets comprise polyurethane. Most polyurethane suppliers provide polyurethane stock that includes additives such as wax, mold release agents and components that facilitate processing the urethane. These additives typically migrate to the surface of a jacket during a molding process. Such waxes, mold release and processing agents migrate to the polyurethane surface to create a surface layer that presents the traction difficulties mentioned above.

An alternative arrangement is required to minimize or eliminate the undesirable friction characteristics of a typical polymer jacket. This invention addresses that need.

SUMMARY OF THE INVENTION

An example method of making a load bearing member for use in an elevator system includes removing at least some of a layer from at least one surface of a polymer jacket that generally surrounds at least one tension member such that pure polyurethane is exposed. In one example, the method includes completely exposing pure polyurethane across the entire surface.

In one example, at least some of the surface layer is chemically removed using a chemical wash or chemical etching technique, for example. In another example, at least some of the surface layer is mechanically removed using at least one of abrading, rubbing or grinding the jacket surface. In another example, the surface layer is disrupted with a dimpled roller to allow the underlying polyurethane layer to present itself at the surface.

One example load bearing member includes at least one tension member. A jacket generally surrounds the tension member. The jacket has at least one surface with exposed pure polyurethane on an exterior of the jacket. In one example, the surface having exposed pure polyurethane is smooth. In another example, the surface is rough.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 4 is a schematic illustration of an example method of making a load bearing member designed according to an embodiment of this invention.

FIG. 5 schematically illustrates one example arrangement for performing a portion of the method of the FIG. 4 embodiment.

FIG. 6 schematically illustrates another example device used in an embodiment as shown in FIG. 4.

DETAILED DESCRIPTION OF THE PREFERRED EMBODIMENTS

Figure 1:
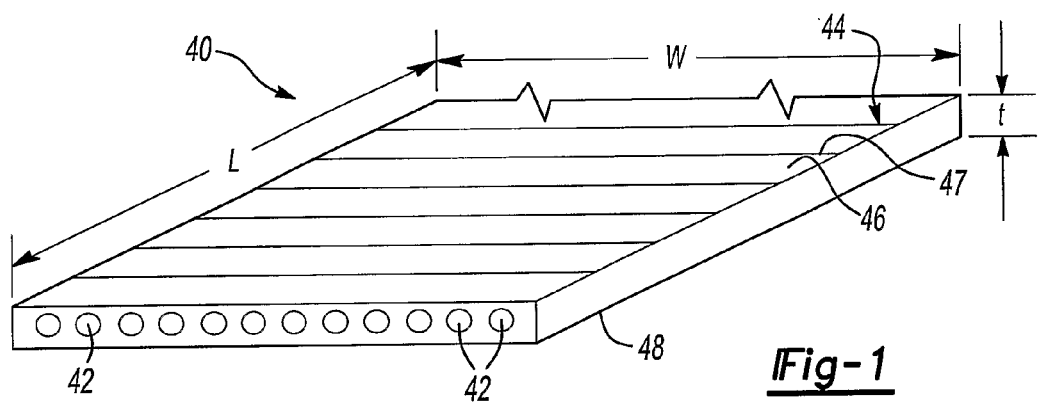
FIG. 1 schematically illustrates a portion of an example load being member designed according to one embodiment of this invention.

FIG. 1 schematically illustrates a load bearing member 40 that is designed for use in an elevator system. A plurality of cords 42 are aligned generally parallel to a longitudinal axis of the load bearing member 40. In one example, the cords 42 are made of strands of steel wire. A jacket 44 generally surrounds the cords 42. In another example, the load bearing member is round, rather than rectangular and may include only a single tension member.

In one example, the jacket 44 comprises a polyurethane-based material. A variety of such materials are commercially available and known in the art to be useful for elevator systems. In one example, the preferred urethane material is a thermoplastic polyurethane (TPU). Other examples include a wide range of TPU, including ether, ester and aliphatic based TPU and derivatives containing fluorine or other elements, as long as the specified TPU provides required mechanical properties. Given this description, those skilled in the art will be able to select a proper jacket material to suit the needs of their particular situation.

The example jacket 44 establishes an exterior length, L, width, W, and a thickness, t, of the load bearing member 40. In one example, the width W of the load bearing member is approximately 30 millimeters and the thickness t is about 3 millimeters. In the same example, the cords 42 have a diameter of 1.65 millimeters. The cords 42 preferably extend along the entire length L of the assembly. The example jacket 44 has exterior surfaces 46 and 48. At least one of the surfaces 46 or 48 will contact a traction sheave and possibly other components within the elevator system as the load bearing member 40 moves to provide the desired elevator cab movement. At least the exterior surface 46 has some exposed pure polyurethane. In one example, pure polyurethane is exposed across the width W and along the length L.

The example assembly includes a plurality of spaced grooves 47 periodically interrupting the surface 46, which result from some belt-making techniques. The portions of the cords at the groove locations may be at least partially exposed and not fully covered with the material of the jacket 44 as known. The grooves 47 may not have pure polyurethane exposed. At least the portions of the jacket extending between the grooves has some exposed pure polyurethane.

The surface 46 results from at least partially displacing (i.e., removing or disrupting) some of the amide-rich layer that migrates to the surface of the jacket 44 during the molding and curing processes used to form the jacket 44. Various techniques for displacing at least some of the layer of the surface 46 are described below.

In the example of FIG. 1, the surface 46 is smooth. In this example, the smooth surface does not prohibit desired traction (as occurred in prior belts having urethane jackets) because the chemical properties of the removed amide-rich layer are no longer present. A surface layer including exposed pure polyurethane exhibits more favorable traction characteristics.

In one example, the entire amide-rich layer is removed such that the entire surface 46 (except the grooves 47) has pure polyurethane exposed. In another example, some of the amide-rich layer remains on the surface 46. In the latter example, only part of the surface 46 has exposed pure polyurethane.

Figure 2:
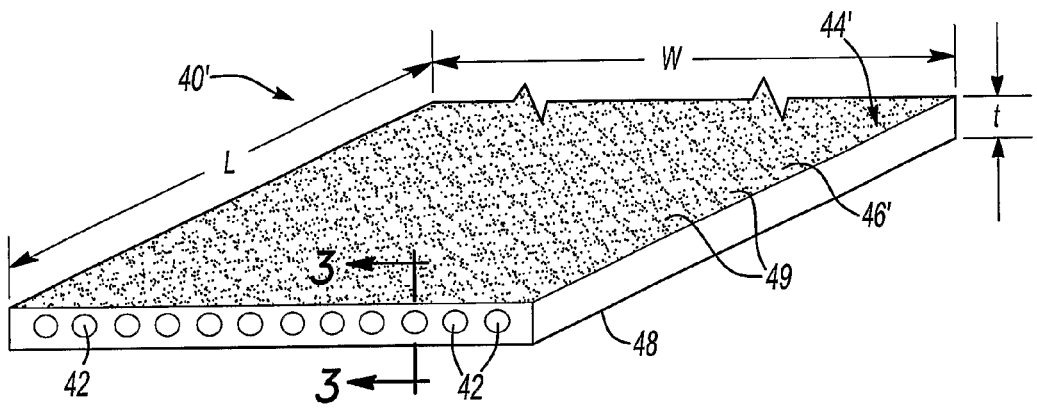
FIG. 2 schematically illustrates a portion of another example load bearing member designed according to another embodiment of this invention.
Figure 3:
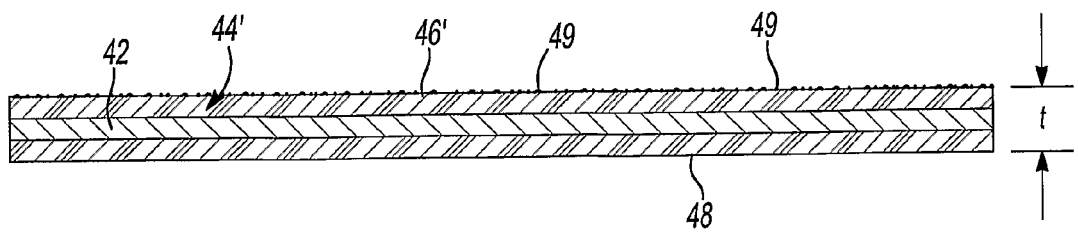
FIG. 3 is a cross-sectional illustration taken along the lines 3-3 in FIG. 2.

FIGS. 2 and 3 show another example embodiment of a load bearing member 40' that is configured as a flat belt but does not include any grooves 47 on the surface 46'. The example of FIGS. 2 and 3 is made using a different manufacturing technique than that used to make the example embodiment of FIG. 1 so that the grooves 47 are only present in the embodiment of FIG. 1. In this example, a plurality of impressions 49' are provided on the surface 46' so that the surface is rough.

The roughness of the example surface 46' includes a plurality of surface irregularities that make the surface 46' rough (i.e., not smooth). In the illustrated example, a plurality of impressions 49 are disbursed about the surface 46'. In some examples, the pattern of the surface irregularities may be established in a controlled manner. In other examples, the surface irregularities are randomly disbursed across the surface 46'.

In one example, a plurality of impressions 49 are provided on the surface 46' that are at least five microns deep. Deeper impressions may be used, depending on the needs of a particular embodiment.

In one example, the rough surface 46' is pure polyurethane across the entire surface. In this example, the impressions 49 are made in the polyurethane material during the process of removing the entire amide-containing layer.

In another example, some of the amide-rich layer remains. In one example, the impressions 49 result from removing corresponding portions of the amide-rich layer in this example, the impressions 49 include exposed pure polyurethane.

The rough surface provides a significantly different coefficient of friction between the load bearing member and a traction sheave compared to a smooth surface with an amide-rich layer over the urethane. The rough surface 46 in some examples significantly decreases the traction. Depending on the urethane material selected for making the jacket 44', if the coefficient of friction decreases with increased pressure, the rough surface 46' effectively increases pressure and decreases friction. On the other hand, with some urethane materials, the coefficient of friction increases with increased pressure so that increased roughness may have the effect of increasing friction. In either situation, the roughness of the surface 46' decreases adhesion even when some of the amide-containing material remains and, therefore, apparent friction. Those skilled in the art who have the benefit of this description will be able to select an appropriate surface texture (i.e., roughness) to meet the needs of their particular situation taking into account the material selected for making the load bearing member assembly.

FIG. 4 schematically illustrates a method of making one example load bearing member. A cord supply 50 provides the cords 42. A positioning device 52 aligns the cords 42 in a desired alignment so that the cords will extend parallel to a longitudinal axis of the load bearing member 40. A tensioning device 54 controls an amount of tension on the cords 42 during the jacket application process. The jacket application station 56 preferably includes a suitable mold or other device for applying the jacket material onto the cords 42. A supply 58 provides the chosen material to the jacket application station 56 in a conventional manner. The jacket material may be pressure molded, extruded or otherwise applied to the cords 42. The formed assembly in this example is finished at a finishing station 60. In the illustrated example, the finishing station includes at least one device for removing at least a portion of at least one surface layer from the jacket 44.

FIG. 5 schematically illustrates a device that is used in an embodiment of this invention for removing at least some of the amide-rich layer from the surface 46 of the jacket 44. In the example of FIG. 5, an abrading pad 65 has a rough surface 66 that is supported in machinery of the finishing station 66 so that the surface 66 engages at least the surface 46 of the jacket 44. In one example, moving machinery causes the abrading device 65 to move rapidly in a circular or reciprocal motion to rub against the jacket 44 for removing a layer from the surface 46.

FIG. 6 schematically illustrates another example where an abrasive sheet 67 such as sandpaper is appropriately supported within the finishing station 60 so that it contacts at least the surface 46 for removing a desired amount of material from the surface 46.

Figure 7:
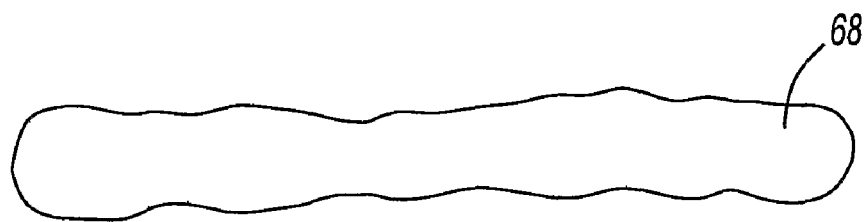
FIG. 7 schematically illustrates another example device used in an embodiment as shown in FIG. 4.
Figure 8:
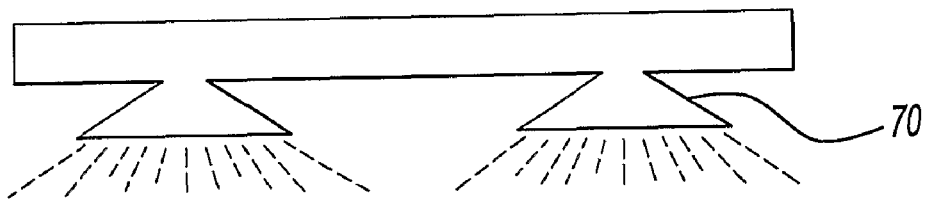
FIG. 8 schematically illustrates another example device used in an embodiment as shown in FIG. 4.

FIG. 7 schematically illustrates another device for removing material from the surface 46. In this example, a buffing pad 68 is supported in an appropriate manner to rub against at least the surface 46 to buff the surface until it has an appropriate amount of roughness.

Figure 9:
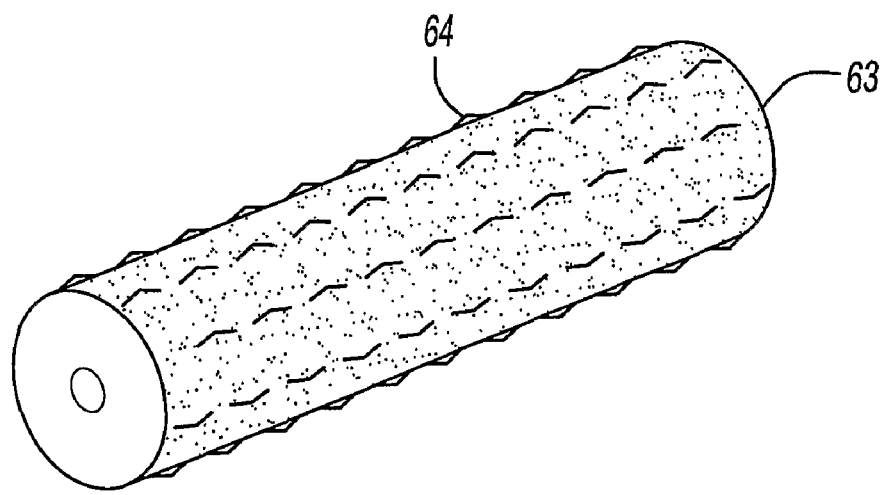
FIG. 9 schematically illustrates an example device for disrupting a surface of an example jacket.

FIG. 9 shows a roller 63 useful for disrupting the surface 46. This example includes protruding portions 64 that disrupt the surface and expose pure polyurethane in corresponding locations of the surface 46. In some examples, the roller 63 does not remove material from the surface 46 but only moves or deforms it. The disruption of the surface layer using a textured roller or wheel can occur while the elastomeric jacket is hot from extrusion. An alternative process would use a heated roller or an external heat source to deform the surface of a cool thermoplastic jacket some time after extrusion. The principle of this method is to disrupt the surface layer of waxes and allow the base elastomer properties to print through.

The particular device or devices shown for mechanically removing material from the surface 46 may vary depending on the particular material selected for making the jacket and the particular surface texture desired for a given application. Additionally, the removal process may be dry or wet to facilitate material handling, for example. Those skilled in the art who have the benefit of this description will realize what will work best for their situation, which may include a combination of more than one of the devices described here or other, similarly functional devices.

While the examples of FIGS. 5-7 and 9 illustrate mechanical displacing techniques, another example finishing station 60 utilizes a chemical-based removal process. An applicator 70 applies a chemical wash such as a mixture of 2-Butoxyethanol and water for example to at least the surface 46 in one example to partially erode the material on the surface 46 resulting in a surface including exposed pure polyurethane once the chemical wash is rinsed away, by water for example. In another example, a chemical etching technique is applied to at least the surface 46. Those skilled in the art who have the benefit of this description will be able to select appropriate chemicals and processing times to achieve the desired amount of pure polyurethane exposure of at least the surface 46 to meet the needs of their particular situation.

In one example, the finishing station 60 also includes a forming device, a dimensional inspection device and a curing cold water bath where the jacket material and the cords within the material are cooled to a suitable temperature. The finishing station forming device preferably includes a rigid structure that forces the jacket to have a desired exterior configuration (i.e., a rectangular cross section). The inspection device, such as a known laser triangulation measuring device, determines whether the desired geometry was achieved.

The resulting load bearing member 40 preferably is then stored at 62, for example on spools for shipment to various locations for installation in elevator systems. The load bearing member 40 may be precut to specific lengths or may be provided in larger quantities where a technician at the installation selects the appropriate amount of belt material for a particular application.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a load bearing member for use in an elevator system, comprising:
    displacing at least some material on at least one surface of a polymer jacket that generally surrounds at least one tension member, wherein the displacing exposes pure polyurethane on a majority of the one surface for achieving a desired traction characteristic of the jacket.

2. The method of claim 1, including disrupting the one surface.

3. The method of claim 1, wherein the displacing includes removing material from the one surface along an entire length of the one surface.

4. The method of claim 1, wherein the exposed pure polyurethane is randomly disbursed across the one surface.

5. The method of claim 1, wherein the jacket comprises an amide-rich layer on the one surface and the displacing comprises removing at least some of the amide-rich layer.

6. The method of claim 1, including mechanically removing the material from the one surface.

7. The method of claim 6, including at least one of rubbing, grinding, abrading or buffing the one surface.

8. The method of claim 1, wherein the displacing includes removing material from the one surface across an entire width of the one surface.

9. The method of claim 8, wherein the displacing includes removing material from the one surface along an entire length of the one surface.

10. The method of claim 1, including chemically removing the material from the one surface.

11. The method of claim 10, including applying a chemical to the one surface wherein the chemical comprises a mixture of 2-Butoxyethanol and water.

12. The method of claim 10, including at least one of chemically etching or chemically washing the one surface.

13. A method of making a load bearing member for use in an elevator system, the load bearing member including a polymer jacket that has an inner layer having a first frictional property and a surface layer having a second, different frictional property, the method comprising;
    displacing a substantial portion of the surface layer having the second frictional property the displacing comprises at least partially exposing at least some of the inner layer across a substantial portion of a width of the jacket, the exposed inner layer comprising exposed pure polyurethane.

14. The method of claim 13, wherein the displacing includes removing material from the one surface along an entire length of the one surface.

15. The method of claim 13, wherein the exposed pure polyurethane is randomly disbursed across the one surface.

16. The method of claim 13, wherein the jacket comprises an amide-rich layer on the one surface and the displacing comprises removing at least some of the amide-rich layer.

17. The method of claim 13, wherein the displacing includes removing material from the one surface across an entire width of the one surface.

18. The method of claim 17, wherein the displacing includes removing material from the one surface along an entire length of the one surface.

19. A method of making a load bearing member for use in an elevator system, comprising the steps of:
    providing at least one tension member;
    applying a jacket to generally surround the at least one tension member, the jacket forming an amide-rich layer; and
    removing at least some of the amide-rich layer to expose pure polyurethane.

20. The method of claim 19, including removing the at least some of the amide-rich layer from the exterior surface along an entire length of the surface.

21. The method of claim 19, wherein the exposed pure polyurethane is randomly disbursed across an exterior surface of the jacket.

22. The method of claim 19, including removing the at least some of the amide-rich layer from an exterior surface of the jacket across an entire width of the exterior surface.

23. The method of claim 22, including removing the at least some of the amide-rich layer from the exterior surface along an entire length of the surface.

* * * * *